(12) United States Patent
Bergenlid et al.

(10) Patent No.: US 7,221,657 B2
(45) Date of Patent: May 22, 2007

(54) PROCESSING DIFFERENT SIZE PACKET HEADERS FOR A PACKET-BASED CONVERSATIONAL SERVICE IN A MOBILE COMMUNICATIONS SYSTEM

(75) Inventors: Lars Herbert Bergenlid, Sollentuna (SE); Magnus Olsson, Spånga (SE)

(73) Assignee: Telefonaktiebolaget LM Ericsson (publ), Stockhom (SE)

( * ) Notice: Subject to any disclaimer, the term of this patent is extended or adjusted under 35 U.S.C. 154(b) by 1013 days.

(21) Appl. No.: 10/356,737

(22) Filed: Feb. 3, 2003

(65) Prior Publication Data

US 2003/0156584 A1 Aug. 21, 2003

Related U.S. Application Data

(60) Provisional application No. 60/354,483, filed on Feb. 8, 2002.

(51) Int. Cl.
*H04J 1/16* (2006.01)
*H04J 3/14* (2006.01)
*H04L 12/26* (2006.01)
*H04L 12/28* (2006.01)
*G01R 31/08* (2006.01)
*G06F 11/00* (2006.01)

(52) U.S. Cl. .................. 370/252; 370/389; 370/393

(58) Field of Classification Search ................ 370/338, 370/328, 252, 428, 389–393, 477, 331, 437, 370/230; 709/247, 230; 455/436
See application file for complete search history.

(56) References Cited

U.S. PATENT DOCUMENTS 4,975,952 A 12/1990 Mabey et al.
5,191,583 A 3/1993 Pearson et al.
6,967,964 B1 * 11/2005 Svanbro et al. ............. 370/437

(Continued)

FOREIGN PATENT DOCUMENTS

| EP | 0 616 455 | 9/1994 |
|----|-----------|--------|
| EP | 1 220 498 | 7/2002 |

(Continued)

OTHER PUBLICATIONS

K. Svanbro et al, "Voice-Over-IP-Over-Wireless" *11th IEEE International Symposium on Personal Indoor and Mobile Radio Communications*, vol. 1, pp. 24-28, Sep. 2000.

*Primary Examiner*—Chi Pham
*Assistant Examiner*—Prenell Jones
(74) *Attorney, Agent, or Firm*—Nixon & Vanderhye P.C.

(57) ABSTRACT

The capacity and coverage of a packet-based conversational service in a mobile communications system is increased by efficiently provisioning resources for packets that have different length headers transported over the radio interface during the period over which the service is provided. A radio bearer or connection is established between a mobile radio and a radio network to support a packet-based conversational service. The radio bearer or connection is normally configured with radio resources to deliver a particular quality of service assuming that the packet headers will be highly compressed. The length of packets to be transmitted via the radio bearer is checked. Those packets which are longer because of less header compression are detected. Processing is performed to minimize or reduce that impact on system capacity or coverage when the detected packets are transmitted over the radio bearer or connection.

33 Claims, 7 Drawing Sheets

U.S. PATENT DOCUMENTS

2002/0001298 A1    1/2002  Tourunen et al.
2002/0091860 A1*   7/2002  Kalliokulju et al. ........ 709/247
2005/0195750 A1*   9/2005  Le et al. ..................... 370/252

FOREIGN PATENT DOCUMENTS

WO    WO 00/69139    11/2000
WO    WO 02/32097     4/2002

* cited by examiner

PROCESSING DIFFERENT SIZE PACKET HEADERS FOR A PACKET-BASED CONVERSATIONAL SERVICE IN A MOBILE COMMUNICATIONS SYSTEM

PROVISIONAL APPLICATION

Priority is claimed from U.S. provisional application Ser. No. 60/354,483 filed Feb. 8, 2002, the disclosure of which is incorporated here by reference.

CROSS-REFERENCE TO RELATED APPLICATIONS

This application is related to commonly-assigned U.S. patent application Ser. No. 10/347,501, entitled "Packet-Based Conversational Service for a Multimedia Session in a Mobile Communications System," filed Jan. 21, 2003, the disclosure of which is incorporated herein by reference.

FIELD OF THE INVENTION

The present invention relates to Internet Protocol (IP) multimedia communications in a mobile radio communication network where conversational services like voice are effectively and efficiently supported. In particular, the present invention effectively processes different size packet headers to increase the efficiency of a packet-based conversational service in a mobile radio communications system

BACKGROUND AND SUMMARY

Fixed IP networks were originally designed to carry "best effort" traffic where the network makes a "best attempt" to deliver a user packet, but does not guarantee that a user packet will arrive at the destination. IP networks need to support various types of applications. Some of these applications have Quality of Service (QoS) requirements other than "best effort" service. Examples of such applications include various real time applications (IP telephony/voice, video conferencing), streaming services (audio or video), or high quality data services (browsing with bounded download delays).

Although fixed, wireline IP networks are well-established, new and different challenges face IP communications in mobile, wireless communication networks. Consider for example an IP telephony session between a mobile User-A and a User-B, where User-A accesses an IP backbone through a local, radio access, mobile communications network. Examples include a Global System for Mobile communications (GSM) or a Universal Mobile Telecommunications System (UMTS) network.

Quality of service for an IP telephony session can be characterized in terms of bandwidth, packet loss, delay, and jitter. As far as the users are concerned, the perceived quality of service will likely depend on the service provided by the radio access network e.g., a UMTS or GSM/GPRS network. The radio interface is the most challenging interface in the communication in terms of providing a certain capacity and coverage at a particular quality of service. Radio bandwidth is limited, and therefore, the capacity of the system to deliver services to a certain number of users is necessarily limited. And it typically is not an option to achieve a particular quality of service for one or a few users simply by allocating more radio bandwidth. Coverage in a radio mobile radio system is the maximum distance over which a radio base station can reliably communicate with a mobile radio. That coverage is limited by maximum signal transmission levels, fading, path loss, interference, and other impediments to radio transmission.

Third generation mobile communications systems, like a Universal Mobile Telephone communications System (UMTS), provide mobile radios with the ability to conduct multimedia sessions where a communication session between users may include different types of media. A very important medium to support in multimedia sessions is voice.

So there is a need to provide resource-efficient, packet-based conversational (e.g., voice) multimedia services that can be delivered at a quality of service and cost comparable to a traditional circuit-based voice service. Even though the idea of a conversational IP multimedia system (IMS) service is desirable, a practical implementation of a conversational IMS service requires overcoming several technical hurdles before the idea becomes a commercial reality. Conversational IMS services should deliver high speech quality both in terms of fidelity and low delay. Connection set up and service interaction times should be reasonably fast. Packet-based speech must meet very strict delay requirements. For example, a new speech packet in a UMTS may need to be delivered every 20 milliseconds. The radio spectrum must be used efficiently. Services must cover a wide geographic area and be able to service roaming mobile users. Although wire-line access networks permit over-provisioning, wireless networks cannot afford that luxury because of limited radio bandwidth and the need to support user mobility.

One obstacle to efficient communication from a capacity and coverage point of view is the size of the speech packet header relative to the speech packet payload, i.e., the speech content. As shown in FIG. 1, speech packets typically have a long header and a relatively short speech payload. Speech samples are typically sent very frequently, e.g., every 20 ms, so the payload is small. But the header information is not reduced just because the payload is small. An example speech packet header suitable for use in a UMTS contains several packet handling protocol headers—IP header information, User Data Protocol (UDP) header information, and Real Time Protocol (RTP) header information. Each protocol contributes to a longer speech packet header.

Even though the speech packet payload is small, the real time delay requirements for packet-based speech service, (e.g., one speech packet every 20 ms), means there is no time to consolidate multiple payloads into one packet. Such consolidation might be possible for a voice streaming application having less stringent, real time delay requirements. Transmitting a large amount of header information for a relatively small amount of speech content results in low throughput. Too much of the radio bandwidth is needed to transmit "overhead" header information. Using that limited bandwidth to transmit the overhead header information decreases the capacity of the mobile communications system to transmit payload information over the radio interface. Because the mobile terminals have a finite transmit power, using power to transmit overhead information means that less power is available to transmit payload information. Lower power per bit means the physical distance over which a radio communication can take place is reduced, i.e., reduced coverage. Accordingly, the amount of header overhead must be reduced to increase capacity and/or coverage.

Header compression may be used to reduce the amount of header information that must be transmitted with each speech packet over the radio interface. Many header compression techniques generally work by sending only new or changed header information sometimes called "delta" information. The delta information is much less than the normal header information, so much less radio bandwidth is needed to transmit the delta (compressed) header as compared to the full (uncompressed) header.

But there are times when more information must be sent. One such time is when a speech connection is being established. At that point, the full (uncompressed) header must be sent in order to establish the foundation for sending just the delta (compressed) header. Even the amount of delta information varies during the communication. Normally, the delta information is small. But on occasion, it may temporarily increase in size during the communication. If the radio resources for a speech connection are established based on the full header, those resources will later be wasted when the header is sent in compressed form, e.g., just the delta is sent. Alternatively, the radio resources may be established based on the compressed header. But then there is no provision for handling the additional data presented by an uncompressed header or a partially compressed header.

The present invention increases the capacity and coverage of a packet-based conversational service in a mobile communications system by efficiently provisioning resources for speech packets that have dynamic or different length headers during the lifetime of a connection over which the service is provided. A radio bearer, which can be viewed as a logical connection, is established over the radio interface between a mobile radio and a radio network to support a packet-based conversational service. The radio bearer is configured with radio resources to deliver a particular quality of service assuming that the headers will be compressed. The length of or amount information in each packet to be transmitted via the radio connection is detected. Those packets which are longer or have more information because there is no header compression or lesser header compression are detected. Processing is performed to minimize or reduce the impact on system capacity or coverage when transmitted over the radio bearer.

In one example embodiment, reduced impact is achieved by segmenting and buffering longer packets so that the data rate is kept constant or below a maximum rate over the radio interface. The segments are transmitted at the same rate as compressed packets. A buffer management scheme is advantageously employed to manage the segments and packets in the buffer. If too many packets accumulate, old packets are discarded. Bandwidth requirements are maintained, and the administrative cost associated with buffering and buffer management is relatively low.

In another example embodiment, reduced impact is achieved by reconfiguring the radio bearer or connection used to transmit the increased or decreased amount of header data for the different length packets at substantially the same data rate. In this way, strict delay requirements are met, and no packets are discarded. The cost associated with this example embodiment includes increasing the radio bearer bandwidth for longer packets, temporarily diminishing the capacity of the system. There is also an administrative cost and delay associated with reconfiguring the radio bearer connection.

Both example embodiments save system capacity as compared to the situation where radio resources are allocated to transmit full, uncompressed packet headers. The first example embodiment also maintains system coverage but at the cost of some discarded packets buffered for too long. The second example embodiment does not preserve system coverage as well as the first example embodiment, and therefore, may be less preferred.

In both example embodiments, the information can be sent in a transparent mode or in a non-transparent mode. In the transparent mode, there are no explicit information that informs the receiving entity where a speech packet starts or stops. Instead, this packet start/stop information is provided implicitly by fitting the packets exactly into one of plural known formats used by the transporting radio bearer. The transparent mode has a higher capacity than the non-transparent mode, but requires a limited number of known sizes of packet information. The non-transparent mode, on the other hand, lacks this requirement but suffers from somewhat lower capacity.

In another aspect of the invention, a packet protocol may further be employed between the mobile radio and the radio network that does not require transmission of a checksum on the whole packet, thereby providing unequal error protection. Unequal error protection has been used for circuit-switched voice services to improve spectrum efficiency and similar advantages could also be achieved for a packet switched conversational service. Such unequal error protection may be implemented in Internet Protocol version 6 (IPv6) communications using a modified version of User Datagram Protocol (UDP) commonly called UDP lite.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, in one example below, the present invention is described in the context of a multimedia session in a GSM/UMTS/IMS mobile communication system. But the invention is not limited to a packet-based voice service provided in the context of a multimedia session. Instead, the invention may be used when voice is the only media being used in the communication. The present invention may also be employed in any mobile radio communications network that provides packet-based conversational services.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs). This is true for all of the nodes described below including mobile terminals and network nodes.

In the following description, a mobile terminal is one example of a user equipment (UE) that allows a mobile user access to network services. In a mobile radio communications system, the interface between the user equipment and the network is the radio interface. Thus, although following description uses the term "mobile terminal," the present invention may be applied to any type or configuration of user equipment that can communicate over a radio interface.

To realize a QoS with clearly-defined characteristics and functionality, a bearer must be set up from the source to the destination of the service that supports that QoS. A bearer is a logical connection between two entities through one or more interfaces, networks, gateways, etc., and usually corresponds to a data stream. A QoS bearer service includes all aspects to enable the provision of a contracted QoS. Example aspects include the control signaling, user plane transport, and QoS management functionality. The present invention is concerned with one or more radio bearers or connections established for a voice communication involving a mobile terminal.

Figure 2:
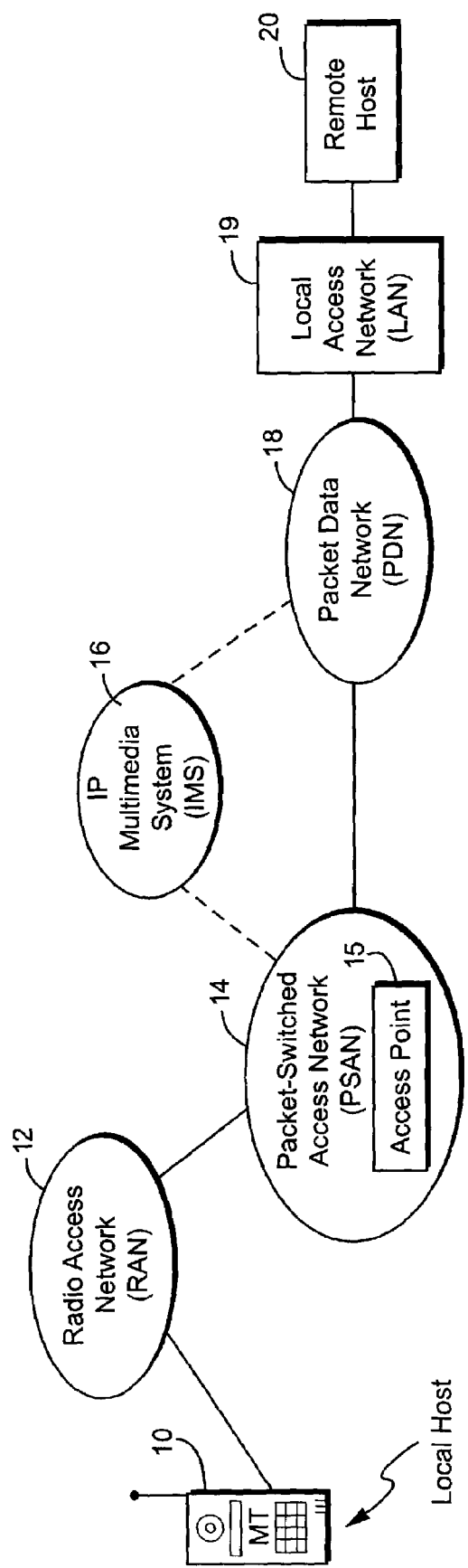
FIG. 2 illustrates a communications system in which a multimedia session may be established between a mobile terminal and a remote host.

The invention may be employed, for example, in the simplified communications system shown in FIG. 2 where a Mobile Terminal (MT) 10 may initiate and conduct a multimedia session with a remote host 20. The mobile terminal 10 is coupled to a radio access network (RAN) 12 over the radio interface. The RAN 12 is coupled to an Access Point 15 in a packet-switched access network (PSAN) 14. The PSAN 14 is coupled to a Packet Data Network (PDN) 18 to which the remote host 20 is coupled via a local access network (LAN) 19. The basic traffic flow for a multimedia session (shown as solid lines) between the mobile terminal 10 and remote host 20 is transported via these three networks 12, 14, and 18. The PSAN 14 and the PDN 18 communicate multimedia control signaling (shown as dashed lines) to an IP Multimedia System (IMS) 16 that can be separate from or an integral part of the Packet Data Network 18.

Figure 3:
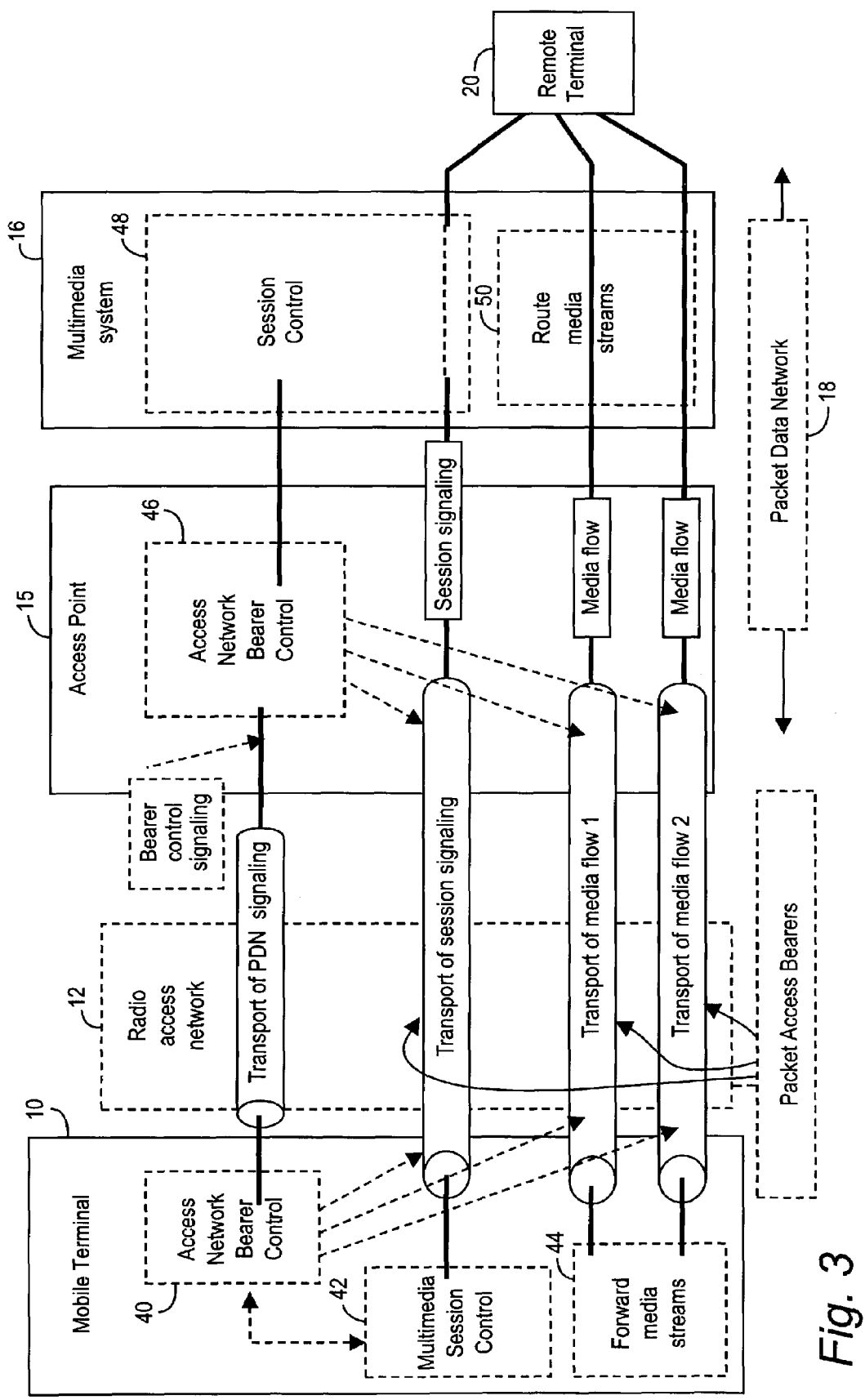
FIG. 3 illustrates in block format various functions performed by the mobile terminal, access point, and multimedia system.

To provide further details regarding setting up a multimedia session between the MT 10 and the remote host 20, reference is now made to FIG. 3. The mobile terminal 10 includes Access Network Bearer Control 40 coupled to multimedia session control 42. The Access Network Bearer Control block 40 transports internal bearer control signaling, which is not dedicated to a particular session, to an Access Network Bearer Control block 46 in the Access Point 15 transparently through the radio access network over a PDN signaling transport bearer. Both Access Network Bearer Control blocks 40 and 46 assist in establishing a packet access bearer for setting up the session shown as the pipe entitled "transport of session signaling." Over this bearer, the mobile terminal 10 initiates a multimedia session including a plurality of media data streams with the remote terminal 20. Each media data stream or "flow" is transported over a corresponding packet access bearer illustrated as a "transport of media flow" pipe coupled to a Forward Media Streams block 44 in the mobile terminal. Two media flows 1 and 2 are shown for purposes of illustration in this multimedia session, one of which is a speech packet flow. The multimedia system 16 in the packet data network 18 employs a Route Media Streams block 50 to route the packets in each media flow between the mobile terminal 10 and the remote terminal/host 20. Multimedia system 16 includes a Session Control block 48 that utilizes session signaling from the Multimedia Session Control block 42 in the mobile terminal 10 to correlate each multimedia flow and its corresponding quality of service requirements with the session to establish necessary admission for the session.

For a multimedia session involving a voice or conversational IMS services, there are normally at least three application flows that must be transported between the mobile terminal and the network: session control messages, the voice media itself, and voice media control messages. The three application flows have different needs and characteristics. QoS parameters of special importance to session signaling include bit rate, delay, and priority. Two example ways of transporting the three flows are described in co-pending U.S. patent application Ser. No. 10/347,501, entitled "Packet-Based Conversational Service for a Multimedia Session in a Mobile Communications System," filed Jan. 21, 2003, describes two example ways of transporting the three flows. Each of the three application flows required for a conversational IMS service may be allocated its own bearer with a QoS class tailored to the characteristics of each flow. Alternatively, the two signaling flows may be assigned to the same bearer and the voice packets are transported using another bearer.

Figure 4:
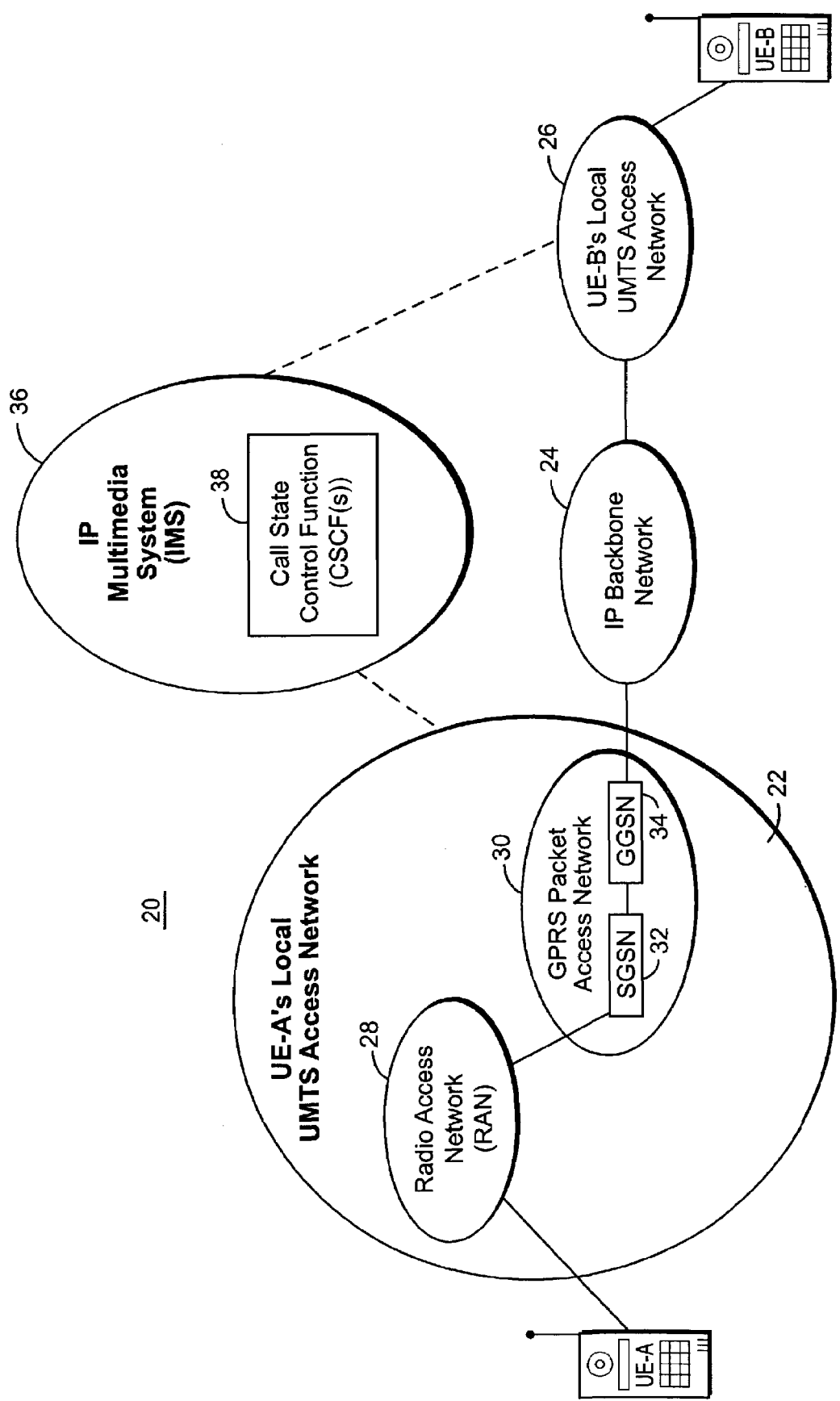
FIG. 4 illustrates a GPRS/UMTS-based communication system for conducting multimedia sessions.

FIG. 4 shows a multimedia session set up via a local General Packet Radio Service (GPRS)/Universal Mobile Telecommunication System (UMTS)-based access network 22. The local GPRS/UMTS network 22 includes a set of network elements between the local host UE-A, corresponding to a Mobile Terminal (MT), and an external packet switching network the user is connecting to, like the Internet. The radio access network (RAN) 28 provides access over the radio interface to/from the MT and includes radio base stations (RBSs) and radio network controllers (RNCs). The RAN 28 is coupled to a GPRS packet access network 30 that includes a supporting Gateway GPRS Support Node (SGSN) 32 and a Gateway GPRS Support Node (GGSN) 34. The GGSN 34 provides interworking between the GPRS/UMTS network 22 and the IP backbone network 24. The coupling (shown as a solid line) between the GPRS/UMTS network 22 and the IP backbone network 24 is used to transport user data IP packets.

The local GPRS/UMTS-type network 22 is coupled to an IP multimedia system (IMS) 36. Communication with the IMS 36 (shown as dashed lines) permits exchange of multimedia session control-related messages. The IMS 36 is typically a part of (although it may be separate from and coupled to) an IP backbone network 24. The remote host corresponding to mobile terminal UE-B is coupled to the IP backbone network 24 through its home cellular network 26, and by signaling connection, to the IMS 36.

The mobile terminal UE-A desires to establish a multimedia session with UE-B that includes a voice or other conversational component. The packet traffic for this session follows the solid line couplings between the various nodes. The session is established with and managed by the IP Multimedia System (IMS) 36. The IMS 36 messages are based on IP application signaling, which in a preferred, example embodiment includes session initiation protocol (SIP) and session description protocol (SDP). SIP is a signaling protocol to establish sessions, and SDP is a text-based syntax to describe the session and includes, for example, the definition of each media stream in the session. The IP multimedia system 36 includes one or more Call State Control Functions (CSCFs) 38.

Before the mobile terminal can send packet data to the remote host, the mobile terminal must "attach" to the GPRS network to make its presence known and to create a Packet Data Protocol (PDP) "context" to establish a relationship with a GGSN. The PDP attach procedure is carried out between the mobile terminal and the SGSN to establish a logical link. As a result, a temporary logical link identity is assigned to the mobile terminal. A PDP context is established between the mobile terminal and a GGSN selected based on the name of the external network to be reached. One or more application flows may be established over a single PDP context through negotiations with the GGSN. An application flow corresponds to a stream of data packets distinguishable as being associated with a particular host application. Example application flows include voice packets carrying digitized (and usually coded) voice samples, an electronic mail message, a link to a particular Internet Service Provider (ISP) to download a graphics file from a web site, etc. One or more application flows may be associated with the same mobile host and the same PDP context. Again, the application flow of interest is the voice or other conversational flow.

Within a GPRS/UMTS access network, radio network resources are managed on a per PDP context level, which corresponds to one or more user flow/data streams and a certain QoS class. A PDP context is implemented as a dynamic table of data entries, comprising all needed information for transferring PDP data units between the mobile terminal and the GGSN, e.g., addressing information, flow control variables, QoS profile, charging information, etc. The PDP context signaling carries the requested and negotiated QoS profile between the nodes in the UMTS network. It has a central role for QoS handling in terms of admission control, negotiation, and modifying of bearers on a QoS level.

Figure 5:
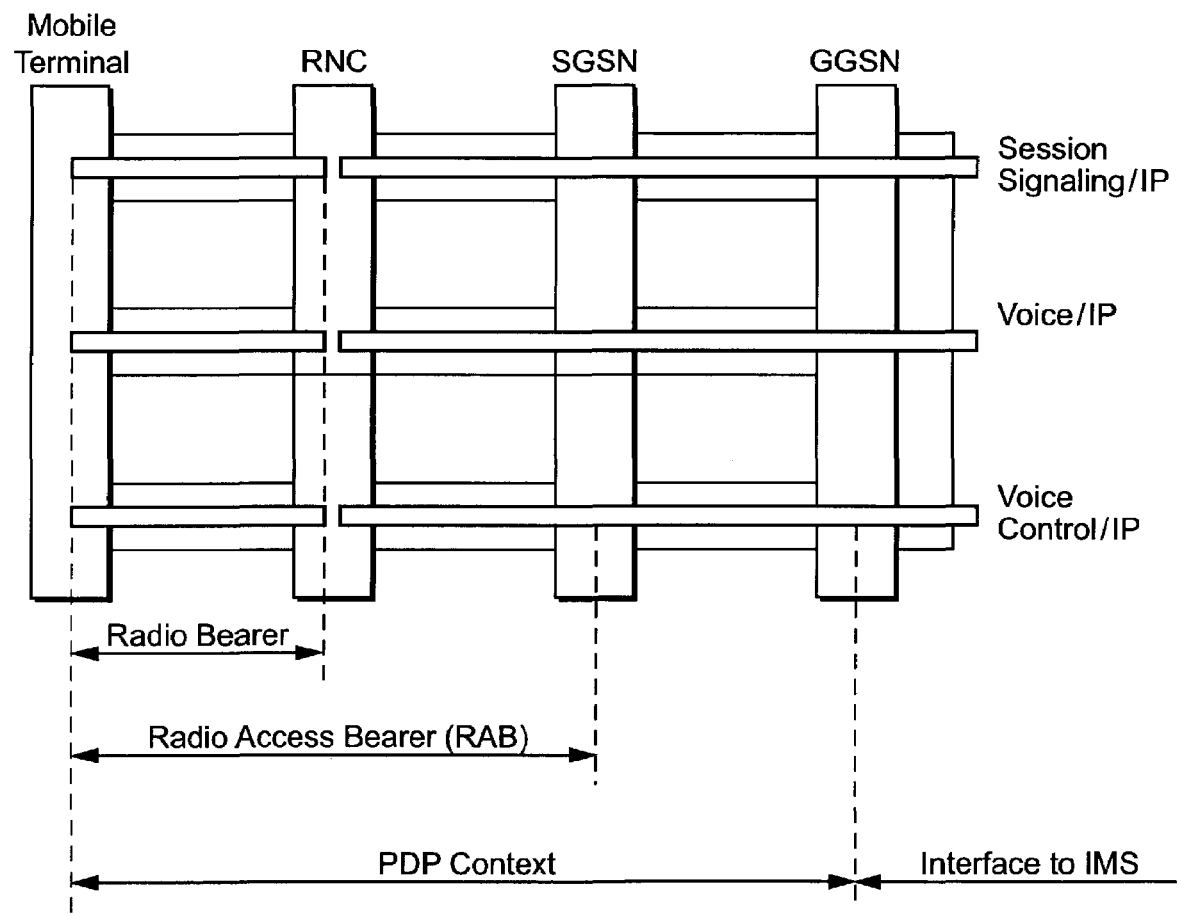
FIG. 5 is a high level diagram showing three separate bearers for supporting a packet-based voice session from the mobile terminal to the IMS interface in a GPRS/UMTS access network.

FIG. 5 illustrates the mapping between radio bearer (MT-RNC), radio access bearer (MT-SGSN), and PDP context (MT-GGSN). The relationship between a radio access bearer and a PDP context is a one-to-one mapping. A radio access bearer is mapped onto one or more radio bearers. The three IP packet flows—session signaling, voice, and voice control—are transported through the UTRAN using separate radio bearers, radio access bearers, and PDP contexts. Alternatively, the three flows may be transported with fewer or greater numbers of radio bearers and/or radio access bearers. As indicated in FIG. 3 in parentheses, example session control signaling that may be used in this example embodiment is Session Initiation Protocol (SIP) messages carrying Session Description Protocol (SDP) information over User Datagram Protocol (UDP). The voice packets may be carried in this example by the Real-Time Transport Protocol (RTP) protocol over UDP, and the control messages associated with the voice packets are Real-Time Control Protocol (RTCP) messages over UDP. Of course, other protocols and formats may be used.

Assume that a radio bearer or connection has been established to support a packet-based voice communication involving a mobile terminal. Because many, if not most, of the incoming packet headers to be transported over the radio bearer will be fully compressed, the radio bearer or connection is established and configured assuming that all packets will have compressed headers. This allows the radio resources to be used more efficiently for this radio connection. On the other hand, there may be times when the packets have less compressed headers. Less compressed packet headers may occur, for example, when a conversational connection is established or occasionally during the communication, e.g., handover situations. In these instances, packets with less compressed headers must be transmitted.

Figure 1:
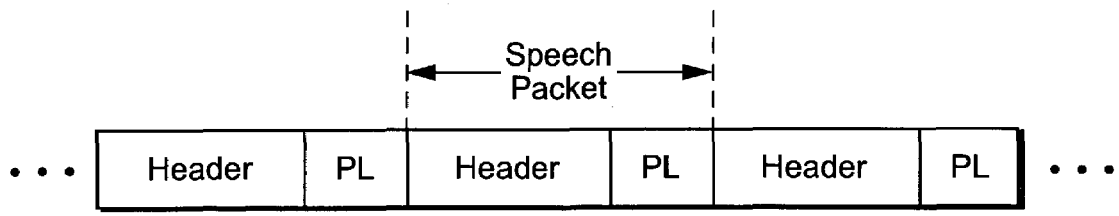
FIG. 1 illustrates relative sizes of voice packet headers to voice packet payloads.
Figure 6:
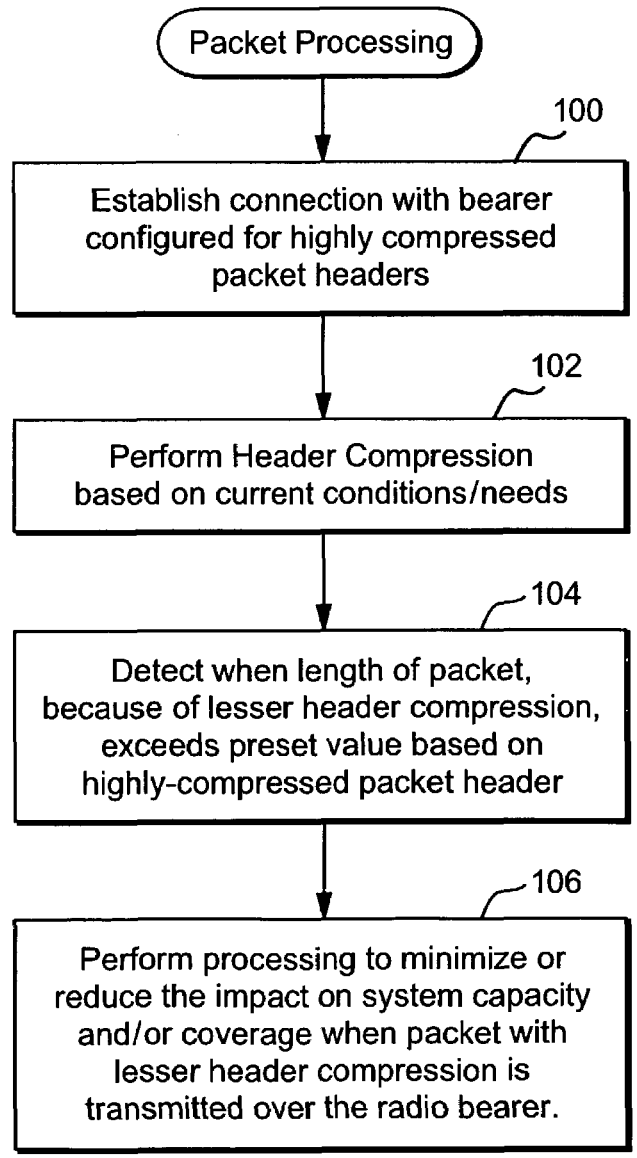
FIG. 6 is a flowchart illustrating example procedures for packet processing in accordance with one aspect of the invention.

The flowchart shown in FIG. 6 entitled "packet processing" illustrates how these packets with longer, less compressed headers are handled. A logical connection associated with a mobile radio communication is established using a bearer configured to transport packets with highly compressed headers (block 100). Headers of packets associated with the communication are compressed based on current conditions or needs (block 102). Normally, the packet header is highly compressed. But there may be instances when the communication is initiated and sometimes during the communication, e.g., at handover, when a lesser amount of header compression is used. The length of each packet is detected to determine whether, because of lesser header compression, the packet's length exceeds a predetermined length associated with a more highly compressed packet header (block 104). With the present invention, processing is performed that minimizes or reduces the impact on system capacity and/or coverage when these packets with longer headers are transmitted over the radio bearer (block 106). In accordance with one non-limiting, example embodiment, such processing includes segmenting longer packets. In accordance with another example embodiment, such processing includes reconfiguring the radio bearer or connection. Processing schemes other than those employed in these two example embodiments may also be used.

Figure 7:
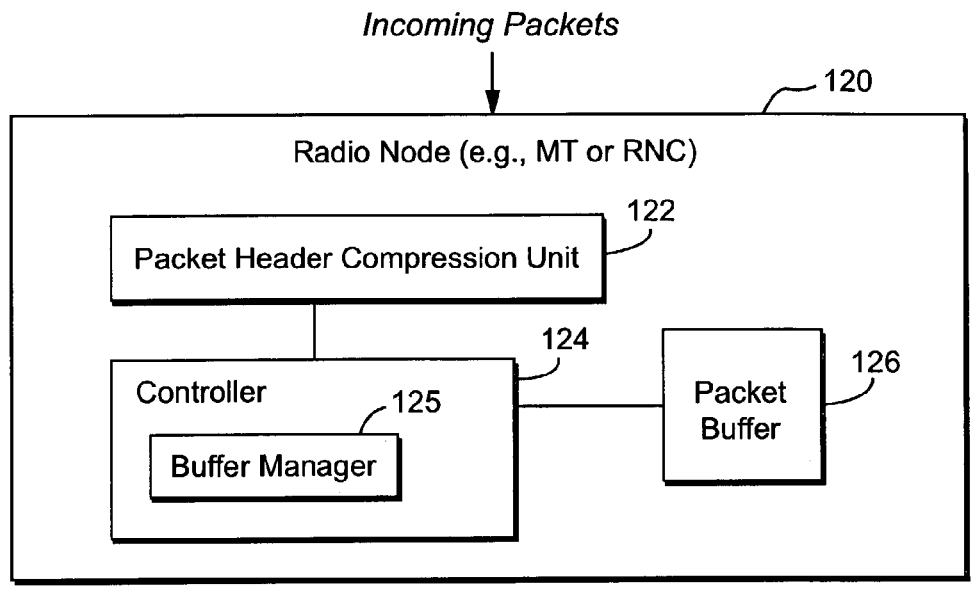
FIG. 7 is a radio node for implementing a non-limiting, example embodiment employing packet segmentation.

Reference is made to FIG. 7 which illustrates a radio node 120 which may be either a mobile terminal node or a radio network node such as a radio base station, a radio network controller (RNC), etc. The radio node includes a packet compression unit 122 coupled to a controller 124. The controller 124 includes a buffer manager 125 and is coupled to a packet buffer 126. The packet header compression unit 122 compresses the headers of incoming packets to the radio node 120. A longer packet length in a speech connection is typically because of an uncompressed or less compressed packet header. Therefore, the controller 124 detects when a packet's length exceeds a predetermined length, e.g., a maximum packet length that can be transmitted in one frame for the configured bearer. In that case, the controller 124 divides the longer packet into two or more segments, depending upon the length of the packet. The segments are transmitted at the same rate at which the packets are transmitted over the radio bearer, e.g., one segment per frame. As a result, no additional bandwidth is needed to transmit the longer packet. However, the packet buffer 126 must store any other packets/segments which are received before all of the segments are transmitted over the radio bearer in the packet buffer. Depending upon how rapidly the packet buffer fills or empties, the buffer manager 125 monitors the time the oldest packet or segment has been sitting in the buffer 126. The buffer manager 125 may discard old packets or segments which usually does not adversely affect the quality of the speech because the lost packets only marginally increase the packet loss rate.

Figure 8:
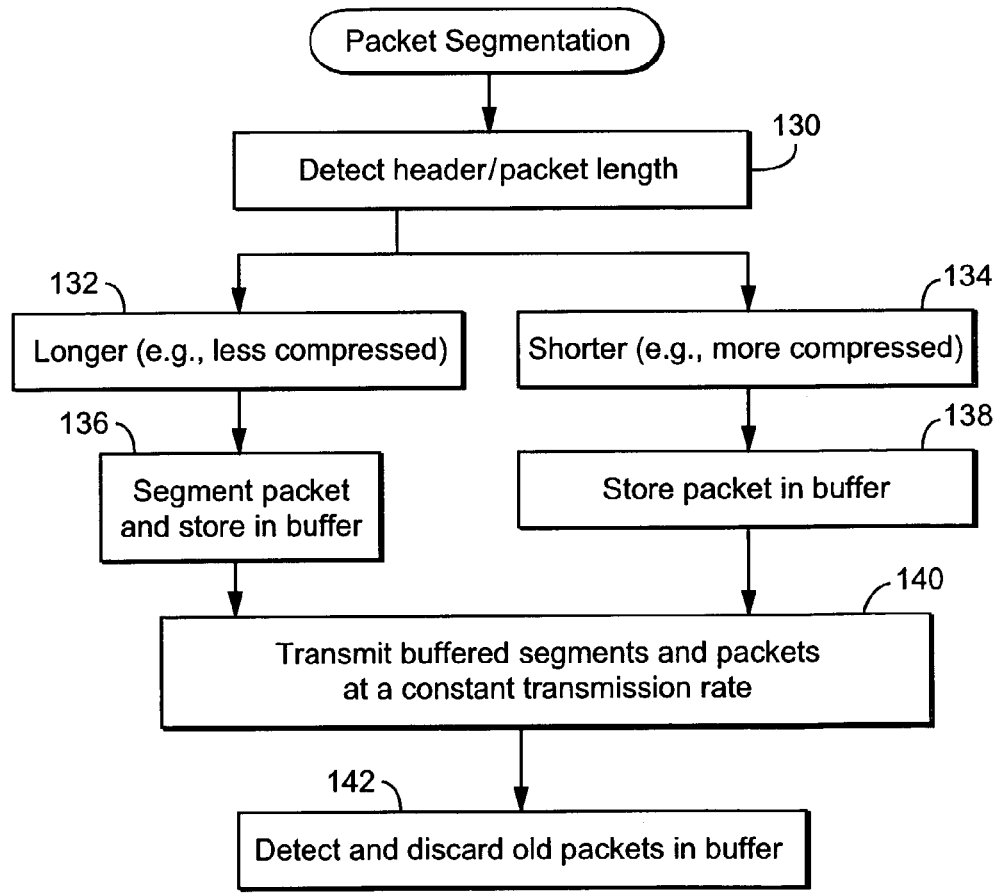
FIG. 8 is a flowchart illustrating example procedures for the packet segmentation employed in FIG. 7.

Reference is made to the flowchart entitled "packet-segmentation" shown in FIG. 8. The packet header length or the packet length is detected (block 130). Longer packets typically have uncompressed or less compressed headers (block 132). Short packets, i.e., those having a length less than are equal to a predetermined length, typically correspond to those with highly compressed headers (block 134). Longer packets are segmented and may be stored in the buffer (block 136). If a packet is received before the buffered segments are transmitted over the radio bearer, it is also stored in the buffer (block 138). Buffered segments and packets are transmitted at a constant transmission rate over the radio bearer (block 140). Preferably, although not necessarily, the buffer is managed to detect and discard old packets or segments in the buffer (block 142).

Figure 9:
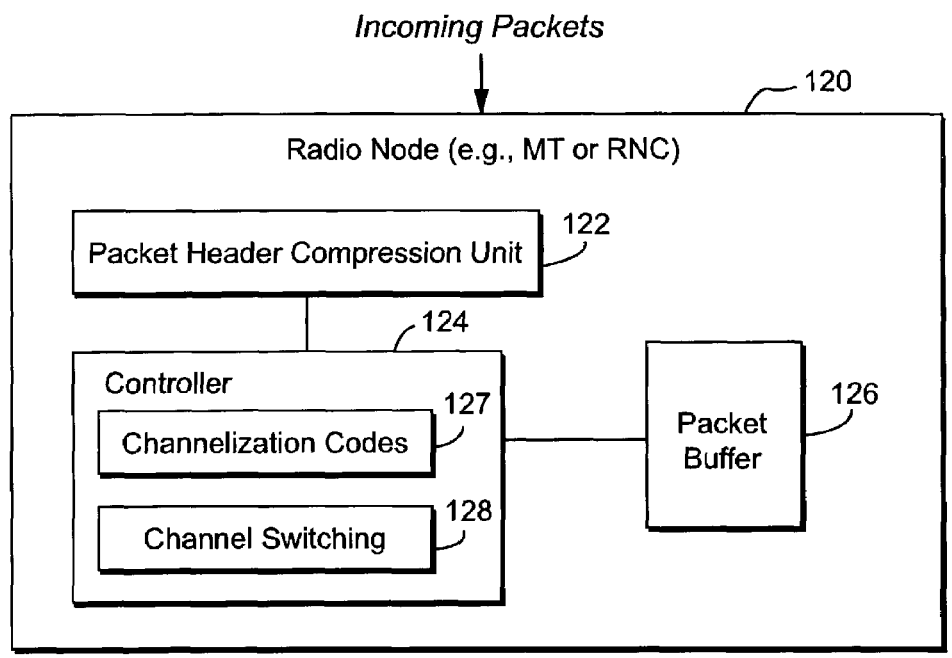
FIG. 9 is a radio node for implementing a non-limiting, example embodiment employing radio bearer or channel reconfiguration.
Figure 10:
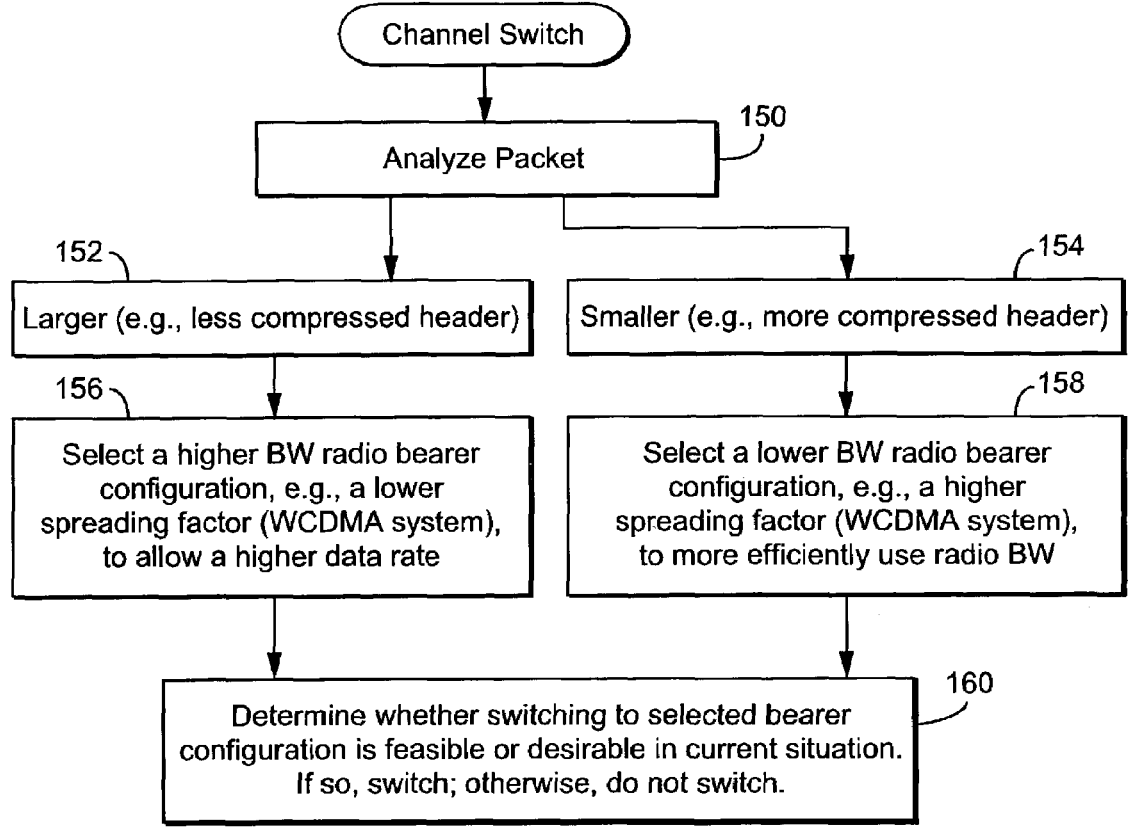
FIG. 10 is a flowchart illustrating example procedures for the radio bearer or channel reconfiguration employed in FIG. 9.

Another unlimiting, example embodiment for reducing the impact of longer speech packet headers is now described in conjunction with FIGS. 9 and 10. FIG. 9 illustrates a radio node 120 with a packet header compression unit 122 coupled to a controller 124 which in turns couple to packet buffer 126. In this example embodiment, the radio network is based on Wideband Code Division Multiple Access (WCDMA) where information is transmitted using channelization codes and well-known spread spectrum techniques. The controller 124 maintains a list of available channelization codes 127 which correspond to available radio resources for transmitting information over the radio interface. When a radio bearer is configured, one or more of these channelization codes is allocated to that radio bearer in order to support the radio bandwidth and quality of service required by that radio bearer. The controller 124 includes a channel switching controller 128 responsible for reconfiguring the radio bearer with channelization codes having a greater or lesser spreading factor as necessary to accommodate changed conditions, which in the present context, corresponds to a change in packet length or amount of information in the packet. Reconfiguring the radio bearer is sometimes referred to as channel switching because radio channel resources, i.e., channelization code spreading factors, are changed or "switched."

A "channel-switch" flowchart is shown in FIG. 10. The packet header size detector 122 analyzes each incoming packet or packet header and detects its length or amount of information (block 150). Based on the comparison with a predetermined length, the packets are classified as larger, e.g., because they have no header compression or less header compression (block 152), or smaller, e.g., because they have more highly compressed headers (block 154). For larger packets, the channel switching controller 128 selects a higher bandwidth radio bearer reconfiguration (block 156). This corresponds to allocating a lower spreading factor for the channelization code(s) allocated to this bearer to allow a higher data rate, thereby accommodating the less compressed header. Alternatively, when the headers are more highly compressed, the channel switching controller 128 may select a lower bandwidth radio bearer reconfiguration (block 158). For example, a higher spreading factor may be selected for the channelization code(s) allocated to this radio bearer to more efficiently use the radio bandwidth. Preferably, although not necessarily, the channel-switching controller 128 determines whether switching to a selected bearer configuration or reconfiguration is feasible or desirable in the current situation. This determination is advantageous because the radio bearer configuration or reconfiguration process takes time and resources to perform and may not be worthwhile in certain circumstances, e.g., if the changed bandwidth is needed only a ver short time. If feasible or desirable in the current situation, the switch is made to the selected bearer; otherwise, there is no switch (block 160).

Advantages of the example segmentation embodiment include no reduction in capacity and no reduction in coverage of the mobile communication system. The cost of the segmentation scheme is relatively low because very little overhead is necessary to do the buffering and buffer management. Discarded packets are usually not a problem because a certain packet loss is expected for speech services. An advantage of the example bearer reconfiguration/channel switching embodiment is that capacity is not reduced when longer packet headers are encountered, as the longer packets are rather infrequent. However, costs include reduced coverage because of greater bandwidth being used by the reconfigured radio bearer and the administrative costs and delays associated with reconfiguring a radio bearer or connection. Other schemes may be employed in order to reduce the impact on system capacity or coverage when longer header packets are transmitted over the radio bearer.

Another aspect of the present invention also saves system capacity by limiting packet length to one of several preset packet sizes that may be transmitted over the radio connection. Packets with different amounts of header compression are sent using the closest, preset packet size. Limiting the packet length to a few preset sizes allows the radio network to send the information in a transparent mode, i.e., with no explicit packet delimiting information. The transparent mode requires less overhead for the bearer thereby permitting more efficient packet transmission, e.g., no explicit overhead information for each packet is required to inform the radio network of a packet's length.

In still another aspect of the invention, a packet protocol may further be employed between the mobile radio and the radio network that does not require transmission of a checksum on the whole packet or that has a checksum that only covers a limited part of the packet. A checksum that only covers a limited part of the packet will give an unequal error protection, as only a part of the packet is protected. Unequal error protection has been used for circuit-switched voice services to increase spectrum efficiency. Unequal error protection provides similar advantages for packet switched conversational services. Not using any checksum in the packet protocol also improves the capacity as less overhead information is then needed. In this case, detection that the information is correct is performed at the radio bearer level. Such unequal error protection may be implemented in Internet Protocol version 6 (IPv6) communications using a modified version of User Datagram Protocol (UDP) commonly called UDP lite. With the UDP lite protocol, there is the possibility to have a checksum that only covers a part of the packet. The complete omission of a checksum is a further evolution of the UDP protocol.

While the present invention has been described with respect to particular embodiments, those skilled in the art will recognize that the present invention is not limited to these specific example embodiments. Different formats, embodiments, and adaptations besides those shown and described as well as many variations, modifications, and equivalent arrangements may also be used to implement the invention. The invention is limited only by the scope of the claims appended hereto.

What is claimed is:

1. In a mobile radio communications system, a method for use with a packet-based conversational service supported by a radio bearer established between a mobile radio terminal and a radio access network, where many of the packets transmitted over the radio bearer have a compressed packet header, comprising:
configuring the radio bearer for transmitting packets whose headers have a first level of compression;
detecting one or more packets to be transmitted over the radio bearer whose headers are less compressed than the first level; and
reducing an impact on capacity or coverage of the mobile radio communications system when the one or more packets are transmitted over the radio bearer.

2. The method in claim 1, wherein the impact on capacity or coverage of the mobile radio communications system is reduced by segmenting each of the one or more packets and transmitting the segments over the radio bearer.

3. The method in claim 2, wherein when the packet is segmented, buffering one or more of the segments and any packets received to be transmitted before the segments are transmitted over the radio bearer.

4. The method in claim 3, wherein one or more of the buffered packets is discarded in accordance with a buffer management plan.

5. The method in claim 1, wherein the impact on capacity of the mobile radio communications system is reduced by configuring the radio bearer for the first compression level and then temporarily reconfiguring the radio bearer to temporarily increase the data rate of the radio bearer.

6. The method in claim 5, further comprising:
determining whether the radio bearer reconfiguration is feasible or desirable in a current situation, and
if the reconfiguration is not desirable or feasible in the current situation, maintaining an existing configuration of the radio bearer.

7. The method in claim 6, wherein the radio bearer is reconfigured by performing a radio channel switching operation.

8. The method in claim 7, wherein the mobile radio communications system employs code division multiple access (CDMA), and wherein the radio channel switching operation includes selecting a lower or a higher spreading factor associated with the radio bearer.

9. The method in claim 1, further comprising:
transmitting the packet over the radio bearer without a checksum.

10. The method in claim 1, further comprising:
performing unequal error protection on the packet before transmitting the packet over the radio bearer.

11. The method in claim 1, further comprising:
limiting a number of packet sizes to a set of predetermined sizes.

12. The method in claim 1, wherein the packet-based service is an Internet Protocol (IP) conversational service, the packets are voice packets carried using Real-Time Transport Protocol (RTP) protocol over User Datagram Protocol (UDP), and the packet header is an IP/UDP/RTP header.

13. For use in a mobile radio communications system, a radio node configured to employ a packet-based conversational service supported by a radio bearer established between a mobile radio terminal and a radio access network, where the radio bearer is configured to transmit packets whose headers have a first level of compression, comprising:
a packet detector for detecting one or more packets to be transmitted over the radio bearer whose headers are less compressed than the first level, and
a controller configured to reduce an impact on capacity or coverage of the mobile radio communications system when the one or more packets are transmitted over the radio bearer.

14. The radio node in claim 13, wherein the controller is configured to reduce the impact on capacity or coverage of the mobile radio communications system by segmenting the one or more packets and transmitting the segments over the radio bearer.

15. The radio node in claim 14, further comprising:
a buffer for storing one or more of the segments and any packets received to be transmitted before the segments are transmitted over the radio bearer,
wherein the controller is configured to discard one or more buffered packets in accordance with a buffer management program.

16. The radio node in claim 13, wherein the controller is configured to reduce the impact on capacity of the mobile radio communications system by temporarily increasing the data rate of the radio bearer.

17. The radio node in claim 16, wherein the controller is configured to determine whether the radio bearer reconfiguration is feasible or desirable in a current situation, and if not, to maintain an existing configuration of the radio bearer.

18. The radio node in claim 17, wherein the controller is configured to reconfigure the radio bearer by performing a radio channel switching operation.

19. The radio node in claim 18, wherein the mobile radio communications system employs code division multiple access (CDMA), and wherein the radio channel switching operation includes changing a spreading factor associated with the radio bearer.

20. The radio node in claim 13, wherein the radio node is the mobile radio.

21. The radio node in claim 13, wherein the radio node is a radio network controller in the radio access network.

22. A radio node configured to process different size packet headers for a packet-based conversational service supported by a radio bearer established between a mobile radio terminal and a radio access network, where the radio bearer is configured to transmit packets whose headers have a first level of compression, comprising:
a packet detector for determining whether a packet to be transmitted over the radio bearer exceeds a predetermined length associated with the first level of header compression, and
a controller configured to segment a packet whose packet header exceeds the predetermined length and have the packet transmitted over the radio bearer as segments rather than as a packet.

23. The radio node in claim 22, further comprising:
a buffer for storing one or more of the segments and any packets received to be transmitted before the segments are transmitted over the radio bearer,
wherein the controller is configured to discard one or more of the buffered packets in accordance with a buffer management plan.

24. The radio node in claim 22, wherein the radio node is the mobile radio.

25. The radio node in claim 22, wherein the radio node is a radio network controller in the radio access network.

26. For use in a mobile radio communications system, a radio node configured to employ a packet-based conversational service supported by a radio bearer established between a mobile radio terminal and a radio access network, where the radio bearer is configured to transmit packets whose headers have a first level of compression, comprising:
- a packet detector for detecting one or more packets to be transmitted over the radio bearer whose headers are less compressed than the first level, and
- a controller configured to reduce an impact on capacity or coverage of the mobile radio communications system when the one or more packets are transmitted over the radio bearer by adapting a rate at which the one or more packets are provided to the radio bearer or by temporarily reconfiguring the radio bearer to accommodate the less compressed headers of the one or more packets.

27. The radio node in claim 26, wherein the controller is configured to segment the one or more packets and transmit the segments over the radio bearer.

28. The radio node in claim 27, further comprising:
- a buffer for storing one or more of the segments and any packets received to be transmitted before the segments are transmitted over the radio bearer,
- wherein the controller is configured to discard one or more of the buffered packets in accordance with a buffer management plan.

29. The radio node in claim 26, wherein the controller is configured to reconfigure the bearer with a temporarily increased the data rate.

30. The radio node in claim 29, wherein the controller is configured to determine whether the radio bearer reconfiguration is feasible or desirable in a current situation, and if not, to maintain an existing configuration of the radio bearer.

31. The radio node in claim 26, wherein the controller is configured to reconfigure the radio bearer by performing a radio channel switching operation.

32. The radio node in claim 26, wherein the radio node is the mobile radio.

33. The radio node in claim 26, wherein the radio node is a radio network controller in the radio access network.

* * * * *